United States Patent

[11] 3,590,976

| [72] | Inventors | Richard Weiss<br>Egesheim;<br>Heinz Neumann, Spaichingen, both of,<br>Germany |
|---|---|---|
| [21] | Appl. No. | 818,354 |
| [22] | Filed | Apr. 22, 1969 |
| [45] | Patented | July 6, 1971 |
| [73] | Assignee | Richard Weiss OHG<br>Egesheim, Germany |

[54] APPARATUS FOR SORTING RING-SHAPED PARTS
10 Claims, 4 Drawing Figs.

[52] U.S. Cl. .................................................. 198/33 AA,
                                                                193/43
[51] Int. Cl. ................................................... B65g 47/24
[50] Field of Search............................................ 193/43;
                                        198/33 R; 221/164, 166, 213

[56] References Cited
UNITED STATES PATENTS

| 1,646,571 | 10/1927 | Avis | 221/166 |
| 2,661,866 | 12/1953 | Lubbert et al. | 221/166 |
| 2,889,960 | 6/1959 | Brancato et al. | 221/166 |
| 3,061,145 | 10/1962 | Sharpe | 221/166 |
| 3,209,888 | 10/1965 | Sterling | 198/33 R |

*Primary Examiner*—Andres H. Nielsen
*Attorney*—Michael S. Striker

ABSTRACT: Apparatus for sorting nuts, washers or similar ring-shaped parts comprises a hopper for a supply of randomly oriented parts, a wheel which extends into the supply of parts and is provided with radial pins which spear the parts during travel through the hopper, and a chute extending tangentially of the wheel and positioned to receive speared parts from the pins. The wheel is provided with blades which agitate the contents of the hopper, and the hopper carries leaf springs which separate improperly engaged parts and orient partially speared parts prior to transfer into the inlet of the chute.

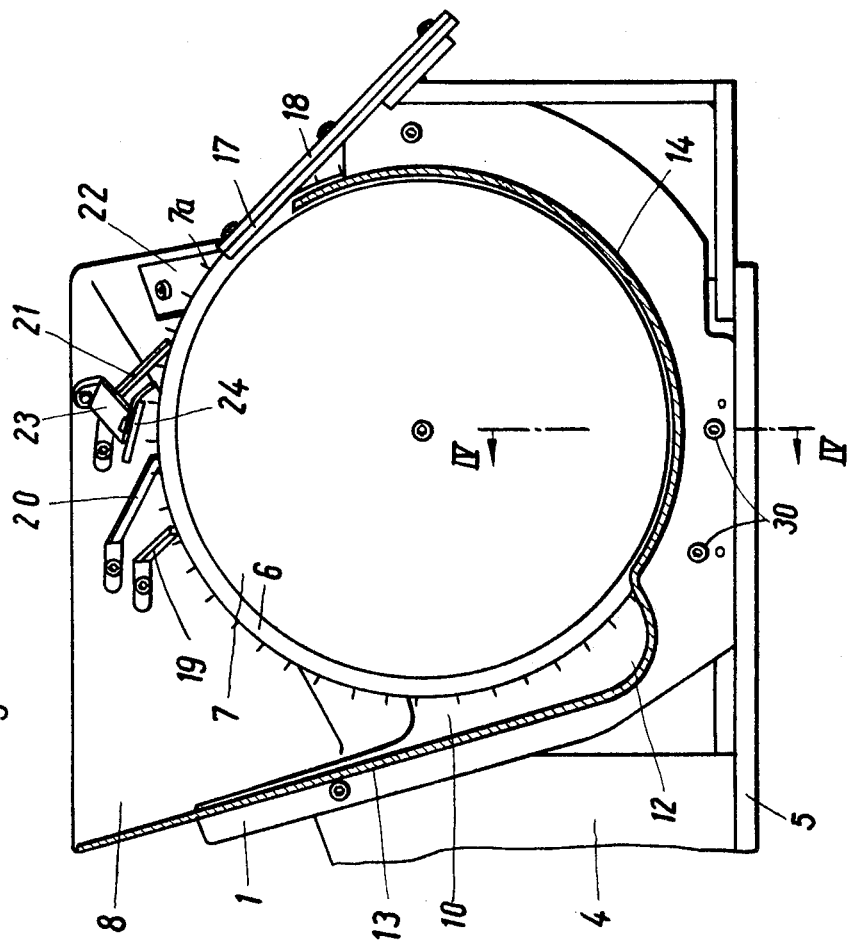
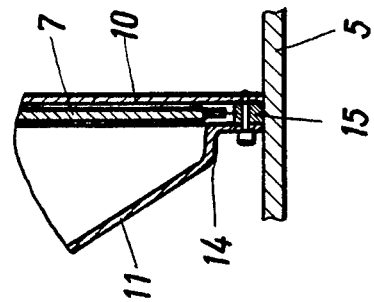

APPARATUS FOR SORTING RING-SHAPED PARTS

BACKGROUND OF THE INVENTION

The present invention relates to apparatus for sorting mass-produced parts, particularly for sorting of nuts, washers, rings or like annular parts. More particularly, the invention relates to improvements in apparatus for sorting and for simultaneously orienting annular parts so that the parts are ready for packaging and/or for treatment in further processing machines, for example, in automatic machine tools.

A machine which produces nuts, washers, rings or like annular parts normally discharges the parts at random, i.e., without a predictable orientation, so that such parts must be sorted and oriented in order to locate them in an optimum position for further processing. In many instances, the parts which are discharged from a producing machine are fed into a receptacle and must be removed and sorted by hand, for example, by being introduced into a channel-shaped magazine which guides the parts to further processing stations. Manual removal of small parts from a receptacle and introduction of the thus removed parts into a magazine or chute is a tedious and time-consuming work, even if the workers are skilled, especially if the parts are rather small and therefore hard to handle.

Certain types of presently known sorting apparatus for ring-shaped parts employ vibrating cylindrical receptacles which are provided with helically shaped internal ribs or fins serving to guide the parts toward the inlet of a chute. A drawback of such apparatus is that they must be furnished with a large number of receptacles, one for each size and for each type of parts. This contributes excessively to the initial cost of the apparatus and results in substantial loses in output whenever the apparatus is to be converted for sorting of different types of parts.

SUMMARY OF THE INVENTION

An object of the present invention is to provide a novel and improved sorting apparatus which is simpler, more versatile, more compact and less expensive than presently known apparatus.

Another object of the invention is to provide a sorting apparatus which is capable of sorting and orienting many types and sizes of articles or parts, especially such parts which resemble rings and are formed with one or more centrally or eccentrically located openings or recesses.

A further object of the invention is to provide an apparatus which can sort and otherwise manipulate substantially ring-shaped parts in a fully automatic way, at a desired speed, and at regular or substantially regular intervals.

The improved apparatus comprises a hopper or another suitable container for a supply of nuts, rings, washers or analogous annular parts, an endless sorting conveyor having a portion travelling in the interior of the contained and including one or more rows of pins or like projections arranged to spear parts during travel in the container and to thereupon withdraw the thus speared parts from the supply, and a downwardly inclined chute or other suitable takeoff means for receiving parts from the projections.

The novel features which are considered as characteristic of the invention are set forth in particular in the appended claims. The improved sorting apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is a fragmentary longitudinal vertical sectional view as seen in the direction of arrows from the line III-III of FIG. 1; and FIG. 4 is a fragmentary transverse vertical sectional view as seen in the direction of arrows from the line IV-IV of FIG. 3.

DESCRIPTION OF THE PREFERRED EMBODIMENTS

Figure 1:
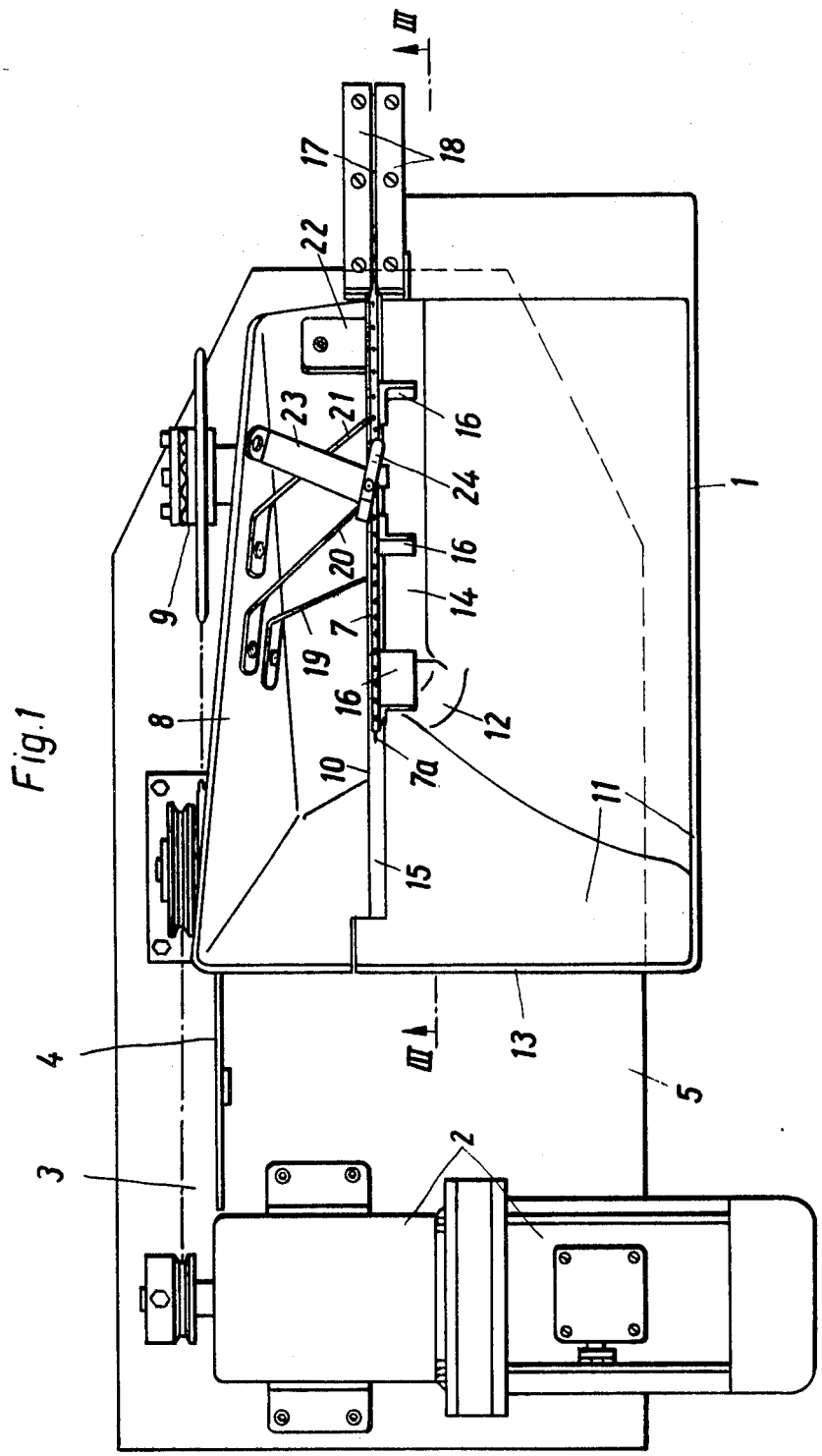
FIG. 1 is a plan view of a sorting apparatus which embodies one form of the invention.
Figure 2:
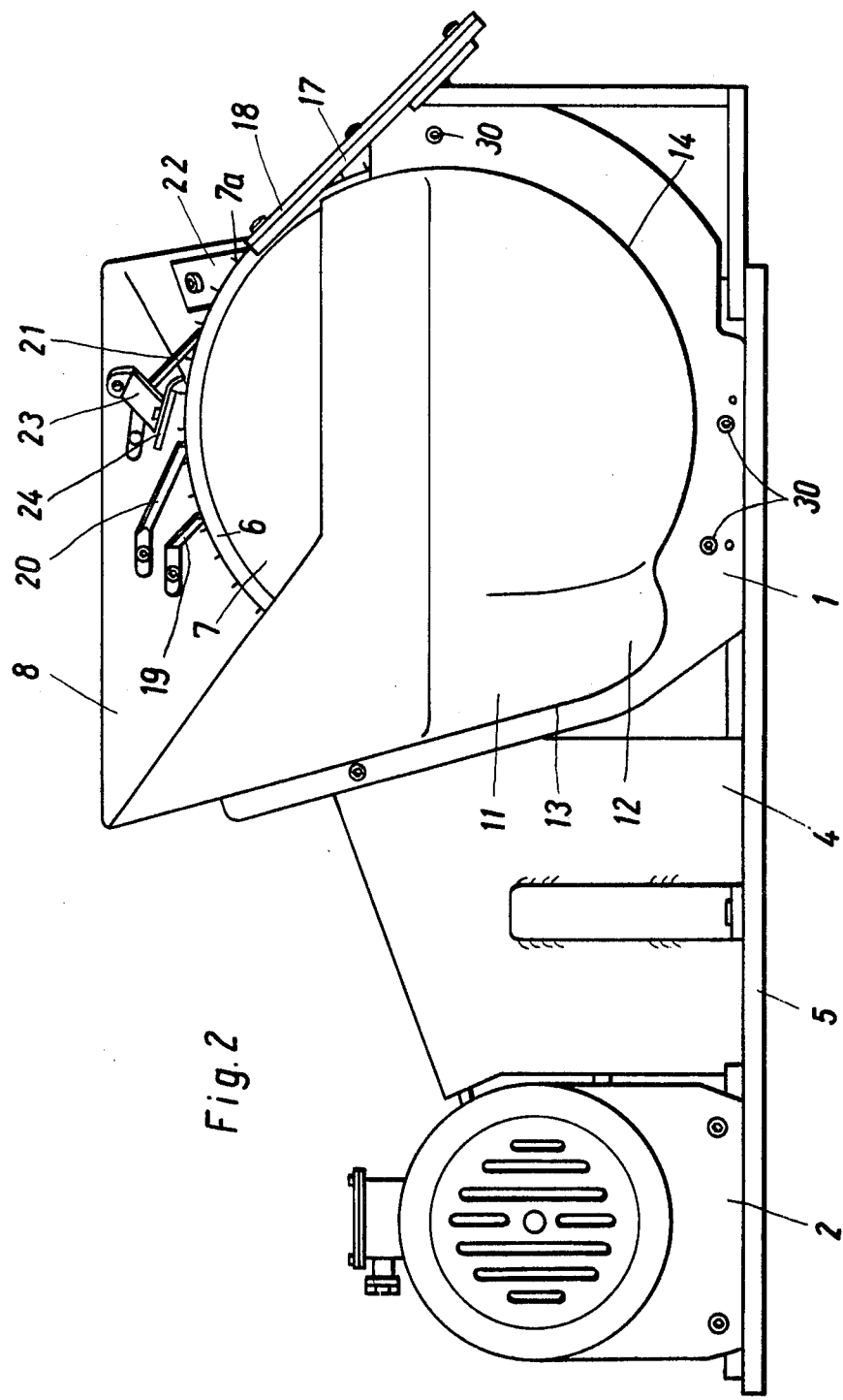
FIG. 2 is a front elevational view of the apparatus.

The sorting apparatus of FIGS. 1 to 4 comprises a container here shown as a hopper 1 which is mounted on a base plate or main support 5. This base plate 5 further supports a prime mover, e.g., a variable-speed electric motor 2 whose output shaft carries a pulley driving an endless V-belt 3. The two stretches of the belt 3 are located behind a protective shield 4 which is also secured to the base plate 5. The hopper 1 accommodates a sorting conveyor here shown as including a wheel 7 having radially outwardly extending projections in the form of pins 7a. The horizontal shaft of the wheel 7 is journaled in the rear wall 8 of the hopper 1 and is driven by the belt 3 through the intermediary of a friction coupling 9. The upper portion of the rear wall 8 slopes upwardly and away from the adjoining side of the wheel 7; the lower portion 10 of this wall is located in a substantially vertical plane and is rather closely adjacent to the adjoining side face of the wheel 7. The line along which the upper portion of the wall 8 merges into the vertical lower portion 10 is located at the level to which the hopper 1 is filled with supply of parts to be sorted; such line is located above the level of the axis of the wheel 7. The front wall 11 of the hopper 1 bulges outwardly from the adjoining side face of the wheel 7 and the left part of its lower portion forms a collecting pocket 12. This pocket merges into an upwardly and outwardly extending sidewall 13 of the hopper 1. The central lower portion of the front wall 11 forms an arcuate section 14 which is located in a vertical plane and overlies the adjoining smooth-faced annular front marginal portion 6 of the wheel 7. The section 14 extends to a level above the axis of the wheel 7 (see FIG. 3). The lower portion 10 of the rear wall 8 defines with the section 14 of the front wall 11 an elongated narrow arcuate channel which communicates with the aforementioned pocket 12 and whose width exceeds only slightly the distance between the front and rear annular marginal portions 6 of the wheel 7. The axial length of the wheel 7 (i.e., the distance between its marginal portions 6) exceeds only slightly the maximum diameters of parts which are to be sorted; the difference corresponds to the maximum tolerances of such parts.

The lower part of the channel between the wall portion 10 and section 14 is closed by an elongated arcuate smooth-surfaced bottom wall or rail 15 whose upper surface is closely adjacent to the tips of pins 7a on the wheel 7 and which is secured to the walls 8 and 11.

The font side of the wheel 7 is provided with several agitating or stirring blades or paddles 16 which extend radially of the wheel and resemble flat plates (see FIG. 1). The blades 16 can be fixedly, adjustably and/or removably secured to the wheel 7 inwardly of the front marginal portion 6. It is also possible to employ curved blades and to position such blades at any desired angle with reference to lines extending radially of the wheel 7.

A takeoff chute is provided on the hopper 1 to evacuate properly oriented parts which are transported by the pins 7a of the wheel 7. This chute comprises a lower guide member 17 of sheet metal and two upper guide members 18 of sheet metal. These members extend tangentially of the wheel 7 and define a narrow downwardly inclined passage in which the oriented parts travel by gravity to a further processing station, for example, to an automatic material removing machine tool or to a packing machine.

The apparatus further comprises a plurality of preferably resilient stripping and orienting elements here shown as yieldable leaf springs 19, 20, 21, 22 and 23. The stripping elements 19—22 are mounted on the rear wall 8 at a level above and close to the apex of the wheel 7 and are positioned in several mutually inclined planes. Their free end portions extend into the path of movement of parts which are not properly speared by the pins 7a so that such parts are separated from the wheel 7 and cannot reach the inlet of the takeoff chute. Another purpose of the stripping elements 19—22 is to expel parts which happen to become wedged between the pins 7a, to expel or separate parts whose size is too small or excessive, and to return the thus separated parts into the lower zone of the hopper 1. The orienting element 23 is inclined with reference to the adjoining pins 77, and carries a plate cam 24 which is outwardly adjacent to the tips of pins 7a and serves to properly position such parts which are speared by the pins 7a but are not located in an optimum position with reference to the wheel. If the parts are nuts, the cam 24 insures that each nut which is partially speared by a pin 7a is moved close to the peripheral surface of the wheel 7 so that such nut can readily enter the inlet of the passage defined by the components 17 and 18 of the takeoff chute.

The operation:

The person in charge (or an automatically operated supply conveyor) admits into the hopper 1 a supply of randomly oriented parts, for example, internally threaded nuts or ring-shaped washers. The prime mover 2 is started to drive the wheel 7 whereby the blades 16 agitate the contents of the hopper 1 and cause some of them to descend into the pocket 12. The parts which enter the pocket 12 are speared by the travelling pins 7a of the wheel 7 and are transported in a clockwise direction, as viewed in FIG. 2 or 3, to move past the stripping elements 19—22 and the cam 24 of the orienting element 23. Those wall portions of the hopper 1 which are adjacent to the path of parts which are speared by the pins 7a are dimensioned in such a way that they prevent lateral escape of parts and thus insure that the parts are compelled to share the movements of pins 7a toward the takeoff chute. The portions of the walls which form the hopper 1 further insure that the travelling parts cannot become wedged or jammed on their way toward and past the stripping and orienting elements 19—23. The stripping elements 19-aa remove from the wheel 7 all such parts which are not engaged by the pins 7a, which are too small or too large, and/or which are held by pins 7a in such a way that they could not be properly introduced into the takeoff chute. The cam 24 of the orienting element 23 performs the aforediscussed function of pushing properly but not fully speared parts toward the peripheral surface of the wheel 7.

The friction coupling 9 normally rotates the shaft of the wheel 7 without any slippage. This coupling is provided as a safety device for the purpose of avoiding damage to the prime mover 2 and/or wheel 7 when the latter encounters a predetermined maximum permissible resistance to rotation. This can happen for example if a part jams at the inlet of the takeoff chute or if the hopper 1 receives one or more parts which are too large for introduction into the chute. If desired, the apparatus may be provided with a safety device which produces a visible or audible signal when the friction coupling ceases to transmit torque to the wheel 7.

It was found that the pins 7a can withdraw a surprisingly large number of parts per unit of time, even if the hopper 1 contains a supply of parts in random orientation and even if the parts include smaller, medium-sized and larger parts having openings or recesses of different diameters. It was further found that the pins 7a can evacuate parts from a relatively large or from a relatively small supply of parts in the hopper 1, i.e., that such pins can evacuate parts regardless of the number of such parts in the hopper.

The conveyor including the wheel 7 can be replaced by a conveyor which comprises an endless belt having one or more rows of outwardly extending projections in the form of pins, studs or the like. At the present time, we prefer to employ a conveyor which includes a wheel or disc having a single row of projections extending beyond the peripheral surface of the wheel. Experiments have shown that a wheel with a single row of projections is more effective than a wheel with two or more rows of projections. The feature that the axial distance between the smooth-surfaced annular marginal portions 6 of the wheel 7 exceeds only slightly the maximum diameters of annular parts in the hopper 1 contributes to the output of the apparatus by insuring that a travelling pin 7a is more likely to spear a part during travel through the hopper 1 and that the parts which are adjacent to the path of travel of the pins are in a satisfactory position for spearing.

The aforedescribed configuration of hopper walls insures that parts which are agitated by the blades 16 are more likely to enter the channel between the wall portion 10 and section 14 in an optimum position or orientation for spearing by the pins 7a.

The purpose of the stripping elements 19—22 is to reduce the likelihood of damage to the apparatus in the event that a careless operator happens to introduce into the hopper parts which are too small for spearing by pins 7a and/or too large for introduction into the inlet of the takeoff chute. This can happen even if the refilling of the hopper 1 is carried out with utmost care. Furthermore, the gaps between the pins 7a can receive and entrain parts from the lower portion of the hopper 1 whereby such parts could jam the inlet of the takeoff chute or could interfere with rotation of the wheel 7. All such parts are reliably removed by the elements 19—22 in a region close to the apex of the wheel 7 so that the thus stripped or removed parts can descent into the hopper by gravity. If desired, the apparatus can be provided with suitable intercepting means for those parts which are removed by the stripping elements 19—22 to make sure that too small or too large parts cannot return into the hopper.

The hopper 1 is preferably separably secured to the baseplate 5 by screws, bolts or analogous fasteners 30. Also, the wheel 7 preferably installed in such a way that it can be rapidly separated from the hopper 1 and from the operative connection between its shaft and the prime mover 2. This enables the persons in charge to convert the apparatus for sorting of larger or smaller parts simply by replacing the hopper and/or the wheel with a spare component. However, each wheel 7 is preferably designed in such a way that it can readily sort parts whose internal and external diameters are within a rather wide range. The same applies for the hopper 1.

The illustrated apparatus comprises a prime mover which is a variable speed electric motor. However, the apparatus can embody a hydraulic or pneumatic motor or a constant-speed electric motor which drives the wheel 7 by way of a variable-speed transmission.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What we claim as new and desired to be protected by Letters Patent is set forth in the appended claims:

1. Apparatus for sorting nuts, washers or analogous substantially ring-shaped parts, comprising a container arranged to accommodate a supply of randomly oriented parts; a narrow rotary sorting wheel having a portion arranged to travel in the interior of said container and including a plurality of at least substantially straight and at least substantially radial projections arranged to spear parts during travel in said container and to thereupon withdraw the thus speared parts from the container, each of said projections extending from the periphery from said wheel through a distance which is a small fraction of the radius of said wheel and said container comprising a first wall located at one side of and closely adjacent to said wheel and a second wall located at the other side of said wheel and defining a pocket for reception of randomly oriented parts in a region adjacent to the path of movement of said projections; and takeoff means for receiving parts from said projections.

2. Apparatus as defined in claim 1, wherein said projections form a single row.

3. Apparatus as defined in claim 1, wherein said wheel comprises a pair of smooth-faced annular marginal portions flanking the peripheral surface of said wheel and wherein the axial distance between said marginal portions slightly exceeds the maximum diameters of parts in said container.

4. Apparatus as defined in claim 1, further comprising agitating means provided on said wheel to stir the contents of said container.

5. Apparatus as defined in claim 4, wherein said wheel is rotatable about a substantially horizontal axis and said agitating means comprises blades provided on and adjacent to one side of said wheel, said projections comprising pins extending substantially radially beyond the peripheral surface of said wheel.

6. Apparatus as defined in claim 1, wherein said wheel is rotatable about a substantially horizontal axis and wherein said portion is the lower portion of said wheel, and further comprising stripping means including at least one stripping element adjacent to the path of movement of said projections at a level above the supply of parts in said container and operative to separate from the wheel such parts which are entrained by the wheel without being properly speared by said projections.

7. Apparatus as defined in claim 6, wherein said stripping element is yieldable.

8. Apparatus as defined in claim 6, wherein said stripping means includes a plurality of mutually inclined stripping elements.

9. Apparatus for sorting nuts, washers or analogous substantially ring-shaped parts, comprising a container arranged to accommodate a supply of randomly oriented parts; a rotary sorting wheel having a portion arranged to travel in the interior of said container and including a plurality of pins extending substantially radially beyond the periphery of said wheel and arranged to spear parts during travel in said container and to thereupon withdraw the thus speared parts from the container, said container comprising a first wall located at one side of said wheel and having a substantially platelike portion closely adjacent to the wheel, and a second wall located at the other side of said wheel and defining a pocket for reception of randomly oriented parts in a region adjacent to the path of movement of said pins; and takeoff means for receiving parts from said pins, said second wall of said container further comprising an arcuate section extending along said wheel from said pocket toward said takeoff means and located opposite said platelike portion.

10. Apparatus as defined in claim 9, wherein said platelike portion and said section define a narrow channel and flank the adjoining portion of said wheel, said channel being in communication with said pocket and said container further comprising an arcuate bottom wall for each channel, said bottom wall being located opposite the pins on said wheel.